United States Patent [19]

Azbell

[11] Patent Number: 4,774,802
[45] Date of Patent: Oct. 4, 1988

[54] GRASS CATCHER

[75] Inventor: Charles G. Azbell, Rochester, N.Y.

[73] Assignee: Power Lawn Mower Parts, Inc., Rochester, N.Y.

[21] Appl. No.: 111,883

[22] Filed: Oct. 23, 1987

[51] Int. Cl.⁴ .................... A01D 34/70; A01D 75/00
[52] U.S. Cl. ..................................... 56/202; 56/320.2
[58] Field of Search ................. 56/202, 320.2, 16.6; 248/287, 670, 172

[56] References Cited

U.S. PATENT DOCUMENTS

| | | | |
|---|---|---|---|
| Re. 24,955 | 3/1961 | Campbell | 56/202 |
| 2,932,146 | 4/1960 | Campbell | 56/202 |
| 3,099,123 | 7/1963 | Price | 56/202 |
| 3,197,949 | 8/1965 | Waag | 56/202 |
| 3,230,696 | 1/1966 | Liljenberg | 56/202 |
| 3,503,192 | 3/1970 | Berg et al. | 56/202 |
| 3,513,649 | 5/1970 | Berg | 56/202 |
| 3,553,947 | 1/1971 | Root | 56/202 |
| 3,570,641 | 3/1971 | LeFeuvre et al. | 56/16.6 |
| 3,624,699 | 11/1971 | Hoffmann | 56/202 |
| 3,820,313 | 6/1974 | Hoffmann | 56/202 |
| 4,008,559 | 2/1977 | Lessig, III et al. | 56/202 |

OTHER PUBLICATIONS

Brochure describing Reyco Pride Products Grass Catcher Assembly, Temco Prod. Inc., P.O. Box 1068, South Gate, Calif. 90280.
Brochure describing Industrial Filters Inc. Lawn Mower Replacement Catchers, 128 32nd St., Brooklyn, N.Y. 11232.
Brochure describing Universal Grass Catcher, Allstate Lawn Products Inc., 3010 Ranchview Lane, Minneapolis, Minn. 55447.
Assembly Instructions for Universal Grass Catcher, Arnold Corp., P.O. Box 703, Shelby, Ohio 44875.

Primary Examiner—Paul J. Hirsch
Assistant Examiner—Vincent Ciamacco
Attorney, Agent, or Firm—Martin LuKacher

[57] ABSTRACT

A universal grass catcher which may be used with lawnmowers having grass discharge openings from the sides of the decks thereof, which may be of different size and have different attachment means, such as a hook or spaced pins which are mounted on the deck adjacent to the discharge opening. An adjustable frame which can be contracted or expanded to match the size of the discharge opening is attached to arms which carry the grass collecting bag. The open end of the bag is fastened around the frame. A support plate is mounted to the frame and may be connected between outer ends of the arms. The support plate projects perpendicular to the frame and rests on the deck. The support plate has a slot which receives the hook or the pins. A stop plate is moveably mounted on the support plate and has a slot which is aligned with the slot in the support plate. This stop plate is located on the support plate so that an edge thereof and one end of the slot in the support plate define a slot length about equal to the length of the hook. When a hook attachment is used on the mower it receives one of the pins of a dual pin attachment. The stop plate prevents movement of the grass catcher assembly once it is positioned on the lawnmower deck. Since practically all lawnmowers have hook or pin attachments, the grass catcher is universally useful with almost all types of lawnmowers.

13 Claims, 4 Drawing Sheets

GRASS CATCHER

DESCRIPTION

The present invention relates to a grass catcher for use on a lawnmower, and particularly to a universal grass catcher which is adapted for use with a wide variety of lawnmowers.

The invention is especially suitable for use with rotary lawnmowers having a deck with a side discharge opening which may be the end of a chute extending from the deck. The lawnmower in accordance with the invention is universally adapted for use with such lawnmowers, since it fits almost all sizes of discharge openings and is adapted to be removably attached to lawnmowers having either hooks or dual pins for grass catcher attachments.

Both universal adaptability and a reliable means of attachment to various types of lawnmowers is the principal problem facing the designer of a universal grass catcher. Most side discharge rotary lawnmowers have either hooks or pins for grass catcher attachment or can readily be equipped with brackets which present such hooks or pins to the grass catcher. It is necessary that the grass catcher be useful with factory installed attachment means, whether they consist of hooks or pins, or with hooks or pins which are installed by the user after purchase of the lawnmower.

Another problem with universal grass catchers is their lack of stability. Oftentimes the grass catcher works loose while the grass is being cut and falls off. The attachment must be reliable even though the bag which collects the grass may be filled almost to its capacity. In addition, the grass catcher must easily be assembled, since it must be shipped in knocked-down condition. The grass catcher must also be simple in design so as to be manufactured at low cost to meet the needs of the market.

It is the principal object of the present invention to provide an improved grass catcher wherein the foregoing problems are obviated and the needs which are discussed above are also met.

It is another object of the present invention to provide a grass catcher which is adjustable to fit various sizes and models of side discharge rotary lawnmowers and to provide for stable and reliable attachment, and easy removal after the bag is filled with grass.

It is a still further object of the present invention to provide an improved grass catcher which is universally adapted for use with lawnmowers having either hook or pin grass catcher attachment means.

Briefly described, an improved grass catcher embodying the invention is adapted to be removably attached to a lawnmower having a deck with a grass discharge opening. The deck may be equipped with either a hook or with pins which are attached to the deck adjacent to the discharge opening. The grass catcher has an arm which supports a grass collecting bag so that the bag can extend away from the discharge opening. A support plate is attached to the arm and has a slot therein longer than the length of the hook or the distance between pins. A frame having an outline approximately the same as the discharge opening, and which may have moveable parts so as to be expanded or contracted to match the discharge opening, is attached to the support plate. The support plate provides a platform on the deck. The support plate has a slot in which either the pins or the hooks may be received. A stop plate is moveably mounted on the support plate. The stop plate has a slot and edges. The stop plate slot is aligned with the support plate slot. The stop plate is assembled with the support plate so that an edge thereof defines the length of the support plate slot and sets the length so that it is about equal to the length of the hook. The hook is then stably received in the slot of requisite length and cannot move in the direction of the slot. Stability during mowing operations is, therefore, maintained. Similarly, where pins are used, the assembly of stop plate and support plate sets the slot length in the stop plate so that it receives one of the pins. The other pin may bear against an end of the support plate slot. Stability of the grass catcher is therefore maintained whether the attachment means is ether pins or a hook.

The foregoing and other objects, features and advantages of the invention, as well as the presently preferred embodiment thereof, will become more apparent from a reading of the following description in connection with the accompanying drawings in which.

Figure 1:
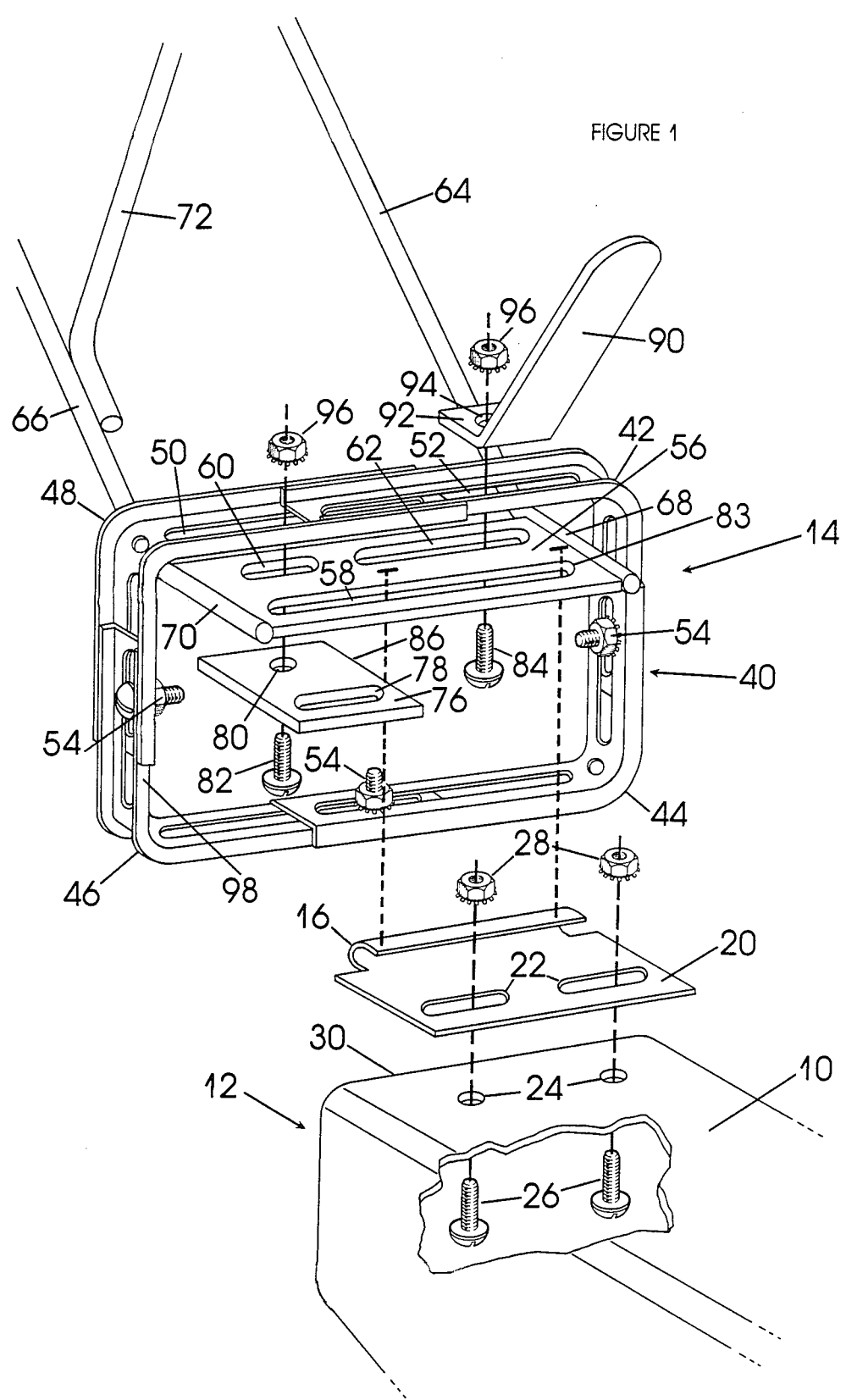
FIG. 1 is an exploded, perspective view of a universal grass catcher embodying the invention which is adapted to be used with a hook attachment to the deck of the lawnmower.
Figure 2:
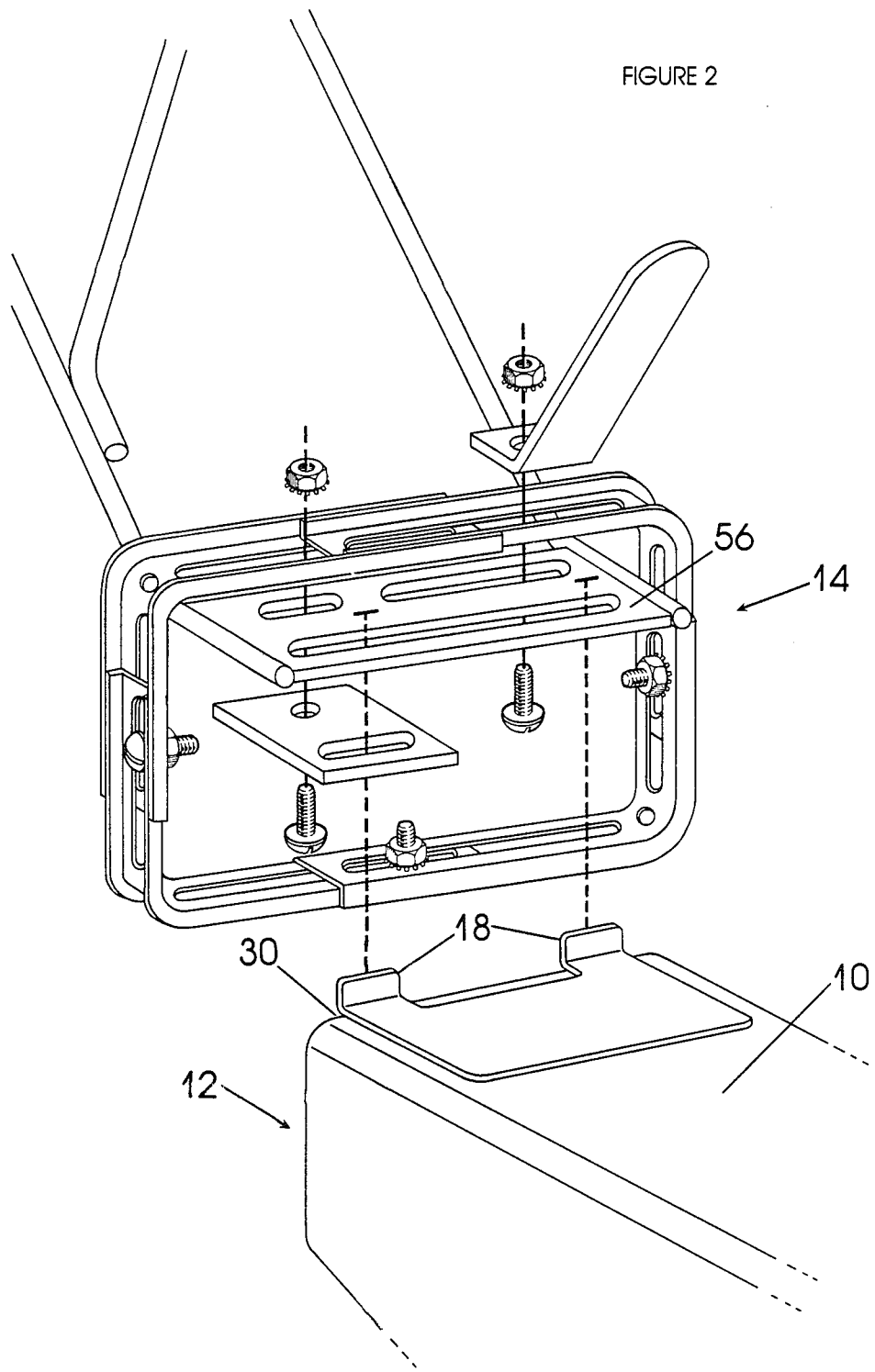
FIG. 2 is an exploded view of a universal grass catcher as shown in FIG. 1 which is adapted for use with a lawnmower having dual pins for attaching a grass catcher thereto.

Referring to the drawings, there is shown a discharge chute 10 from a side discharge rotary lawnmower. This discharge chute has a discharge opening 12 at the outlet thereof. The universal grass catcher 14 is adapted to be connected to the lawnmower at the discharge chute and supported by the portion of the deck of the lawnmower provided by the end of the discharge chute. Such support is provided whether the lawnmower has a hook 16 (FIGS. 1 and 3) or a dual pin 18 (FIGS. 2 and 4) attachment means. While the dual pin 18 is shown as dual tabs, the pins are referred to as "pins" in the art. Accordingly, the nomenclature "pins" is used herein.

In the case of the hook attachment means, the hook may be an integral part of the lawnmower or may be attached thereto by being at the end of a bracket plate 20. The bracket plate has slots 22 which are aligned with holes 24 in the deck. Bolts 26 extend to the aligned holes 24 and slots 22 and adjustably position the bracket 20. The nuts 28 are used to fasten the bracket 20 and the hook to the deck of the lawnmower. The hook 16 is disposed along the upper edge 30 of the discharge opening 12. The pins 18 may be attached to the deck by similar means as the bracket 20, and can lie along the edge 30. The pin bracket slots, bolts and nuts are not shown in FIGS. 2 and 4 for the sake of simplicity.

The grass catcher has a frame 40 which is made up of four L-shaped channels 42, 44, 46 and 48 which telescope into each other. These channels define a rectangular body with an opening therein. The sides of the channels have slots. The upper side slots 50 and 52 are in alignment with each other, as are the slots in the other sides of the frame 40. The length and width of the frame is adjusted by moving the channels 42 to 48 to separate them or bring them together. They are set in position by nuts and bolts 54 which extend to the aligned slots in the channels. The slots 50 and 52 in the upper side provide for the attachment of a support plate 56. This support plate has a front slot 58 and two slots 60 and 62 which parallel the front slot.

The lawnmower bag (shown by the dash lines in FIGS. 2 and 4) is supported on arms 64 and 66 which may be closed at the top and define a "U". The open ends of 68 and 70 of these arms 64, 66 are bent at an obtuse angle (e.g. about 120°) and are attached as by welding to the edges of the support plate 56. A cross rod 72 is used to lend further support and rigidity to the arms 66 and 64. The bag (shown by dash lines) is supported by the arms 66 and 64 and has an open end, suitably wih an elastic band so as to fit within the channel of the frame 40.

The slot 58 is longer than the length of the hook 16 and therefore can accept hooks of different length. The slot 58 is also longer than the distance between the outer edges of the pins 18 (FIG. 2) so that it can receive and accept pin attachment means with pins of different separation distances.

Attached to the support plate 56 is a stop plate 76. This stop plate has a forward slot 78 and a rearward hole 80. The slot is approximately the same length as the pins 18. The stop plate is assembled with its slot 78 in alignment with the slot 58 and with the hole 80 in alignment with the slot 60. The arms and the support plate are attached to the frame by bolts 82 and 84. The bolts 84 extend to the aligned hole 80, slot 60 and slot 50 in the upper side of the frame 40. The stop plate is moveable along the slot 60 so as to set the length of the support plate slot to be about equal to the length of the hook 16. The hook is then received between one of the opposite ends 83 of the slot 58 and one of the edges 86 of the stop plate 76.

When pin type attachment means 18 are used, the stop plate is located so that one of the dual pins extends through the aligned slots 78 in the stop plate and 58 in the support plate. The other pin is then adjacent to and can bear against the end 83 of the support plate slot 58. Firm and stable location of the support plate in either hook or pin connectors 16 or 18 is therefore obtained.

Figure 3:
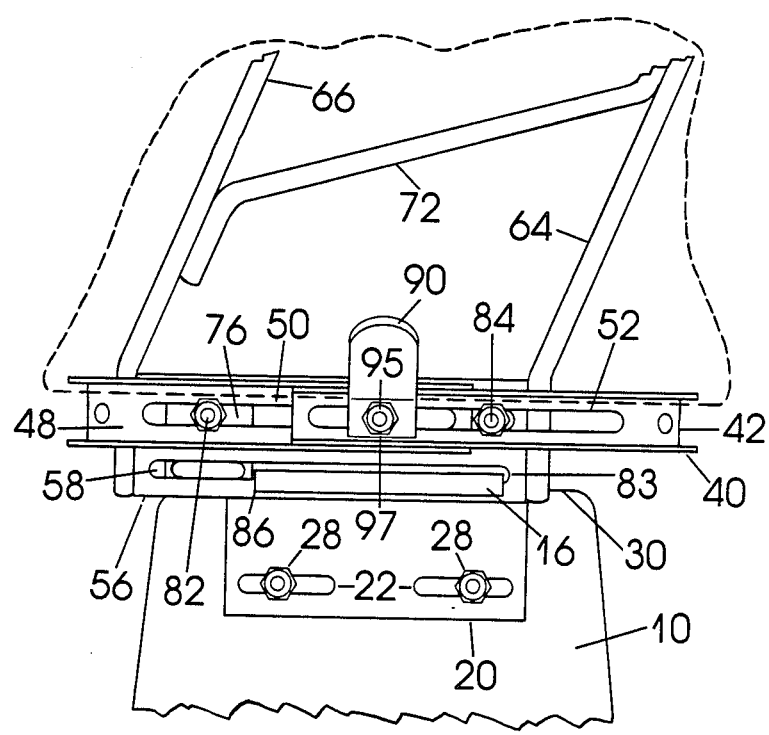
FIG. 3 is a plan view of the grass catcher shown in FIG. 1.
Figure 4:
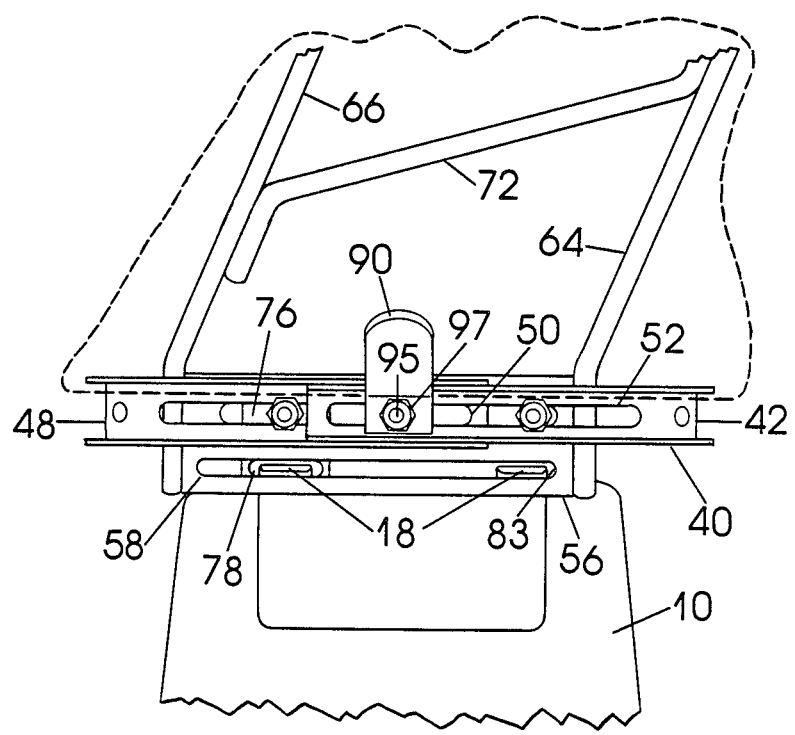
FIG. 4 is a plan view of the grass catcher shown in FIG. 2.

Sometimes lawnmowers are equipped with spring biased deflector plates which cover their discharge opening. These deflector plates must be pivoted and held out of the way of the grass catcher. To this end a deflector bracket 90 is used. This bracket 90 has a tongue with a base 92. The base 92 has a hole 94 through which one of the bolts 84 extends after it passes through the slot 62 and the slot 52 in the upper side of the frame 40. When the stop plate 76 and deflector 90 are set in position, nuts 96 are used which are screwed on to the bolts 82 and 84 to complete the assembly. Alternatively, as shown in FIGS. 3 and 4, a separate bolt 95 and nut 97 can be used to locate and attach the tongue 90 to the frame 40.

When the grass catcher is in place the forward side 98 of the frame bears against the discharge opening 12, while the support plate 56 bears upon the portion of the deck adjacent to the edge 30 of the discharge opening 12. A firm stable location and connection of the grass catcher to the lawnmower is therefore made. Merely by either lifting up (in the case of pins) or tilting and then lifting (in the case of the hook attachment 16), the grass catcher can be removed for dumping of grass or storage when the lawnmower and grass catcher are not in use.

From the foregoing description it will be apparent that there has been provided an improved universal grass catcher. While a preferred embodiment of the invention has been described, variations and modifications thereof, within the scope of the invention, will undoubtedly suggest themselves to those skilled in the art. Accordingly, the foregoing description should be taken as illustrative and not in a limiting sense.

I claim:

1. A grass catcher adapted to be removably attached to a lawnmower having a deck with a grass discharge opening which is equipped either with a hook disposed on said deck or a pair of spaced pins disposed on said deck, said hook having a length substantially parallel with said opening, said grass catcher comprising an arm for supporting a grass collecting bag extending away from said opening, a support plate attached to said arm and having a slot therein longer than the length of said hook and the spacing between said pins, a frame having an outline approximately the same as said discharge opening, said support plate being attached to said frame and extending over said deck with said frame disposed against the discharge opening and with said hook, or pins extending through said slot, said slot having opposite ends, a stop plate moveably disposed on said support plate, said stop plate having a width between side edges thereof which width is less than the width of said slot and having a slot therein approximately equal in length to the length of at least one of said pins, said stop plate being assembled with said support plate to define with one end of said slot in said support plate a slot length equal to the length of said hook, when said lawnmower is equipped with said hook mounted on said deck and with said slot in said stop plate in alignment with said support plate slot, and said stop plate being spaced from one of the ends of said support plate slot a distance about equal to the spacing of said pins for receiving said one of said pins through said aligned slots in said support and stop plate and the other of said pins through said support plate slot, when said lawnmower is equipped with said pins.

2. The invention according to claim 1 wherein said stop plate slot is so spaced from said last named end of said support plate slot that said other of said pins bears against said last named end of said support plate slot.

3. The grass catcher according to claim 1 wherein said arms have forward ends to which said support plate is attached and between which said support plate extends.

4. The grass catcher according to claim 1 wherein one of said support plate and stop plate has a second slot parallelling said first named slot therein and the other has a hole, which slot and hole are in alignment, and a first bolt extending through said aligned second slot and hole for adjustably positioning said stop plate on said support plate.

5. The grass catcher according to claim 3 wherein said frame is generally rectangular and has an upper side with a slot therein, said support plate having a hole spaced from said slot and in alignment with said slot in said upper side of said frame, said aligned slot and hole in said support plate and stop plate also being in alignment with said slot in said upper side of said frame, said first bolt also extending through said slot in said upper side of said frame, a second bolt extending through said hole in said support plate which is aligned with the slot in the upper side of said frame, said frame being moveable with respect to said support plate to adjust the relative position thereof in the direction of the length of said slots, and nuts on said bolts fastening said frame to said support plate in adjusted position.

6. The grass catcher according to claim 5 wherein said frame has a plurality of separate sections with aligned slots, and bolts extending through said slots for adjusting the length and width of said frame to be commensurate with the length and width of said opening, nuts for fastening said sections in adjusted position.

7. The grass catcher according to claim 1 wherein said hook and pins are disposed on said deck along an upper edge of said discharge opening, said support plate being attached to said frame and extending over said upper edge of said deck.

8. A grass catcher comprising a frame disposable against the discharge opening from the deck of a lawn-mower having as attachment means for said grass catcher either a hook or spaced pins, said hook having a length substantially parallel with said opening, arms for supporting a grass collecting bag with an open end of said bag mounted around said frame and extending away from said discharge opening, a support plate also attached to said frame and extending perpendicularly to said frame for defining a platform under which the deck of a portion of said mower adjacent to said discharge opening is disposed when said frame is disposed against said discharge opening, said support plate having a slot long enough to receive said hook therethrough when said hook is mounted on said portion of said deck and also being long enough to receive therethrough a pair of said spaced pins when such pins are mounted on said portion of said deck, a stop plate having a slot, said stop plate being attached to said support plate with the slot therein in alignment with the slot in said support plate, said slot plate having an edge which defines with one of the opposite ends of said slot in said support plate a length for said support plate slot about equal to the length of said hook when said hook is mounted on said deck, and being located away from one of said ends of said slot which is spaced from said last named end of said slot for receiving one of said pins to said aligned slots and said support and stop plate and the other of said pins to said support plate slot.

9. The grass catcher according to claim 8 wherein said arms have forward ends to which said support plate is attached and between which said support plate extends.

10. The grass catcher according to claim 8 wherein one of said support plate and stop plate has a second slot parallelling said first named slot therein and the other has a hole, which slot and hole are in alignment, and a first bolt extending through said aligned second slot and hole for adjustably positioning said stop plate on said support plate.

11. The grass catcher according to claim 9 wherein said frame is generally rectangular and has an upper side with a slot therein, said support plate having a hole spaced from said slot and in alignment with said slot in said upper side of said frame, said aligned slot and hole in said support plate and stop plate also being in alignment with said slot in said upper side of said frame, said first bolt also extending through said slot in said upper side of said frame, a second bolt extending through said hole in said support plate which is aligned with the slot in the upper side of said frame, said frame being moveable with respect to said support plate to adjust the relative position thereof in the direction of the length of said slots, and nuts on said bolts fastening said frame to said support plate in adjusted position.

12. The grass catcher according to claim 1 wherein said frame has a plurality of separate sections with aligned slots, and bolts extending through said slots for adjusting the length and width of said frame to be commensurate with the length and width of said opening, nuts for fastening said sections in adjusted position.

13. The grass catcher according to claim 8 wherein said hook and pins are disposed on said deck along an upper edge of said discharge opening, said support plate being attached to said frame and extending over said upper edge of said deck.

* * * * *